United States Patent
Ai et al.

(10) Patent No.: US 12,123,830 B2
(45) Date of Patent: Oct. 22, 2024

(54) RAPIDLY TUNEABLE DIODE LIDAR

(71) Applicant: QLM Technology Ltd, Paignton (GB)

(72) Inventors: Xiao Ai, Bristol (GB); James Titchener, Bristol (GB)

(73) Assignee: QLM Technology Ltd, Paignton (GB)

( * ) Notice: Subject to any disclaimer, the term of this patent is extended or adjusted under 35 U.S.C. 154(b) by 0 days.

(21) Appl. No.: 18/384,269

(22) Filed: Oct. 26, 2023

(65) Prior Publication Data

US 2024/0192131 A1 Jun. 13, 2024

Related U.S. Application Data

(63) Continuation of application No. 17/615,790, filed as application No. PCT/GB2020/051816 on Jul. 29, 2020.

(30) Foreign Application Priority Data

Aug. 2, 2019 (GB) ..................... 1911081

(51) Int. Cl.
  *G01S 7/4861* (2020.01)
  *G01N 21/3504* (2014.01)
  (Continued)

(52) U.S. Cl.
  CPC ......... *G01N 21/39* (2013.01); *G01N 21/3504* (2013.01); *G01S 7/4861* (2013.01);
  (Continued)

(58) Field of Classification Search
  CPC ............... G01N 21/39; G01N 21/3504; G01N 2021/394; G01N 2021/399; G01S 7/4861; G01S 17/88
  See application file for complete search history.

(56) References Cited

U.S. PATENT DOCUMENTS 6,664,533 B1  12/2003  van der Laan et al.
9,970,756 B2  5/2018  Kreitinger et al.
(Continued)

FOREIGN PATENT DOCUMENTS

EP  3956677 A1  2/2022
GB  2586075 B  7/2021
(Continued)

OTHER PUBLICATIONS

"Atmospheric CO2 remote sensing system based on high brightness semiconductor lasers and single photon counting detection", published in Proc. of SPIE vol. 9645, 964503, dated 2015 by Ai et al. (Year: 2015).*

(Continued)

*Primary Examiner* — Jamil Ahmed
(74) *Attorney, Agent, or Firm* — Haynes Beffel & Wolfeld LLP; Franklin M. Schellenberg

(57) ABSTRACT

A method of operating an optical device, the method comprising tuning a first emission wavelength of a first output radiation of a laser device continuously within a first wavelength spectrum by modulating a drive current thereof with a first drive current modulation having a frequency of at least 100 KHz. The first wavelength spectrum comprises a first spectral feature associated with at least part of a gas absorption spectrum of at least one gas. The method comprises the steps of modulating the first output radiation of the laser device with a first output modulation, the first output modulation comprising a first plurality of binary pulses, scanning the first wavelength spectrum at a rate of at least 1 μm per second, projecting the first output radiation towards a first target area, receiving scattered radiation from the first target area, and processing the scattered radiation.

24 Claims, 6 Drawing Sheets

(51) Int. Cl.
   G01N 21/39 (2006.01)
   G01S 17/88 (2006.01)
(52) U.S. Cl.
   CPC ........ *G01S 17/88* (2013.01); *G01N 2021/394* (2013.01); *G01N 2021/399* (2013.01)

(56) References Cited

U.S. PATENT DOCUMENTS

| | | | |
|---|---|---|---|
| 10,337,859 | B2 | 7/2019 | Kreitinger et al. |
| 10,527,412 | B2 | 1/2020 | Thorpe et al. |
| 11,105,621 | B2 | 8/2021 | Kreitinger et al. |
| 11,391,567 | B2 | 7/2022 | Thorpe et al. |
| 11,656,075 | B2 | 5/2023 | Kreitinger et al. |
| 2003/0030001 | A1 | 2/2003 | Cooper et al. |
| 2016/0084945 | A1 | 3/2016 | Rodrigo et al. |
| 2016/0334507 | A1 | 11/2016 | Hangauer et al. |
| 2018/0058935 | A1* | 3/2018 | Yu ................ H01S 3/1673 |
| 2023/0243648 | A1 | 8/2023 | Kreitinger et al. |

FOREIGN PATENT DOCUMENTS

| | | |
|---|---|---|
| WO | 2005047871 A2 | 5/2005 |
| WO | 2013135611 A2 | 9/2013 |
| WO | 2014180483 A1 | 11/2014 |
| WO | 2019013698 A1 | 1/2019 |
| WO | 2021023971 A1 | 2/2021 |

OTHER PUBLICATIONS

US Office Action from U.S. Appl. No. 17/615,790 (parent) dated Nov. 28, 2023, 17 pages.
GB1911081.6, Notice of Grant dated Jun. 29, 2021, 41 pages.
GB1911081.6, Intention to Grant dated May 11, 2021, 4 pages.
GB1911081.6, Second Examination Report dated Nov. 9, 2020, 1 page.
GB1911081.6, Response to First Examination Report filed Sep. 1, 2020, 14 pages.
GB1911081.6, First Examination Report dated May 14, 2020, 6 pages.
GB1911081.6, Search Report dated Jan. 27, 2020, 4 pages.
EP20751258, Second Office Action dated Sep. 14, 2023, 7 pages.
EP20751258, Response to First Office Action filed Jul. 17, 2023, 22 pages.
EP20751258, First Office Action dated Mar. 21, 2023, 8 pages.
Pérez-Serrano et al., Atmospheric CO2 remote sensing system based on high brightness semiconductor lasers and single photon counting detection, Proc. SPIE 9645, Lidar Technologies, Techniques, and Measurements for Atmospheric Remote Sensing XI, 964503, Oct. 20, 2015, 11 pages (downloaded from https://www.spiedigitallibrary.org/conference-proceedings-of-spie on Oct. 20, 2023).
Takeuchi et al., Diode-laser random-modulation cw lidar, Applied Optics, vol. 25, No. 1, pp. 63-67, Jan. 1, 1986, 5 pgs.
PCT/GB2020/051816, International Search Report and Written Opinion dated Oct. 26, 2020, 15 pages.
Abshire et al., "Airborne Measurements of CO2 Column Concentration and Range Using a Pulsed Direct-Detection IPDA Lidar", Remote Sensing, MDPI, Dec. 30, 2013, vol. 6, pp. 443-469, doi: 10.3390/rs6010443.
Esquivias et al., "Random-Modulation CW Lidar System for Space-Borne Carbon Dioxide Remote Sensing Based on a High-Brightness Semiconductor Laser", International Conference on Space Optics—ISCO 2014, La Caleta, Tenerife, Canary Islands, Oct. 7-10, 2014, SPIE, vol. 10563, pp. 105630R-1-105630R-9, doi: 10.1117/12.2304163.
Takeuchi et al., "Random modulation cw lidar", Optical Society of America, Applied Optics, May 1, 1983, vol. 22, No. 9, pp. 1382-1386.
R. A. Baumgartner et al., "Continuously tunable ir lidar with applications to remote measurements of SO2 and CH4", Optical Society of America, Applied Optics, Nov. 15, 1978, vol. 17, No. 22, pp. 3555-3561.
Hagen et al., "Review of snapshot spectral imaging technologies", Optical Engineering, SPIE, Sep. 23, 2013, vol. 52, No. 9, pp. 090901-1-090901-23.
A. W. Yu et al., "Laser Architectures for Space-Based Sodium Resonance Fluorescence Lidar," 2018 Conference on Lasers and Electro-Optics Pacific Rim (CLEO-PR), Hong Kong, China, 2018, pp. 1-2.
X. Ai et al., "Pseudo-random Single Photon Counting for Space-borne Atmospheric Sensing Applications," 2014 IEEE Aerospace Conference, Big Sky, MT, USA, 2014, pp. 1-10, doi: 10.1109/AERO.2014.6836513.
Chambers et al., "Direct Measurement of Fugitive Emissions of Hydrocarbons from a Refinery", Journal of the Air & Waste Management Association, Aug. 2008, vol. 58, No. 8, pp. 1047-1056, doi: 10.3155/1047-3289.58.8.1047.
B. van Well et al., "An open-path, hand-held laser system for the detection of methane gas", Institute of Physics Publishing, Journal of Optics A: Pure and Applied Optics, May 13, 2005, vol. 7, pp. S420-S424, doi: 10.1088/1464-4258/7/6/025.
M.B. Frish et al., "Progress in reducing size and cost of trace gas analyzers based on Tunable Diode Laser Absorption Spectroscopy", Advanced Environmental, Chemical, and Biological Sensing Technologies II, SPIE, 2004, vol. 5586, pp. 76-82, doi: 10.1117/12.580938.
Innocenti et al., "Differential Absorption Lidar (DIAL) Measurements of Landfill Methane Emissions", Remote Sensing, MDPI, Sep. 14, 2017, vol. 9, No. 953, pp. 1-11, doi: 10.3390/rs9090953.
Golston et al., "Lightweight mid-infrared methane sensor for unmanned aerial systems", Applied Physics B Lasers and Optics, May 19, 2017, vol. 123, No. 170, pp. 1-9, doi: 10.1007/s00340-017-6735-6.
Gardiner et al., "Field Validation of Remote Sensing Methane Emission Measurements", Remote Sensing, MDPI, Sep. 14, 2017, vol. 9, No. 956, pp. 1-10, doi: 10.3390/rs9090956.
Mitchell et al., "Measurements of Methane Emissions from Natural Gas Gathering Facilities and Processing Plants: Measurement Results", Environmental Science & Technology, American Chemical Society, Feb. 10, 2015, vol. 49, pp. 3219-3227, doi: 10.1021/es5052809.
Gålfalk et al., "Making methane visible", Nature Climate Change, Nov. 30, 2015, pp. 1-5, doi: 10.1038/NCLIMATE2877.
Yang et al., "Natural Gas Fugitive Leak Detection Using an Unmanned Aerial Vehicle: Measurement System Description and Mass Balance Approach", Atmosphere, MDPI, Oct. 1, 2018, vol. 9, No. 383, pp. 1-22, doi: 10.3390/atmos9100383.
Krainak et al., "Photon-counting detectors for space-based applications", Detectors and Imaging Devices: Infared, Focal Plane, Single Photon, SPIE, 2010, vol. 7780, pp. 77801J-1-77801J-5, doi: 10.1117/12.864025.
Krainak et al., "Laser Transceivers for Future NASA Missions", Laser Technology for Defense and Security VIII, SPIE, 2012, vol. 8381, pp. 83810Y-1-83810Y-11, doi: 10.1117/12.920783.
Krainak et al., "Self-Raman Nd:YVO4 laser and electro-optic technology for space-based sodium lidar instrument", Solid State Lasers XXIII: Technology and Devices, SPIE, 2014, vol. 8959, pp. 895901-1-895901-9, doi: 10.1117/12.2041453.
Quatrevalet et al., "Atmospheric CO2 Sensing with a Random Modulatiion Continuous Wave Integrated Path Differential Absorption Lidar", IEEE Journal of Slected Topics In Quantum Electronics, Mar./Apr. 2017, vol. 23, No. 2, pp. 443-469, doi: 10.1109/JSTQE.2016.2619325.
X. Ai et al., "Analysis of a random modulation single photon counting differential abosrption lidar system for space-borne atmospheric CO2 sensing", The Optical Society, Optics Express, Sep. 5, 2016, vol. 24, No. 18, pp. 21119-21133, doi: 10.1364/OE.24.021119.
X. Ai et al., "High-resolution random-modulation cw lidar", Optical Society of America, Applied Optics, Jul. 28, 2011, vol. 50, No. 22, pp. 4478-4488.
Wainner et al., "Scanning, standoff TDLAS leak imaging and quantification", Next-Generation Spectroscopic Technologies X,

(56) References Cited

OTHER PUBLICATIONS

SPIE, 2017, vol. 10210, pp. 1021006-1-1021006-11, doi: 10.1117/12.2264799.

* cited by examiner

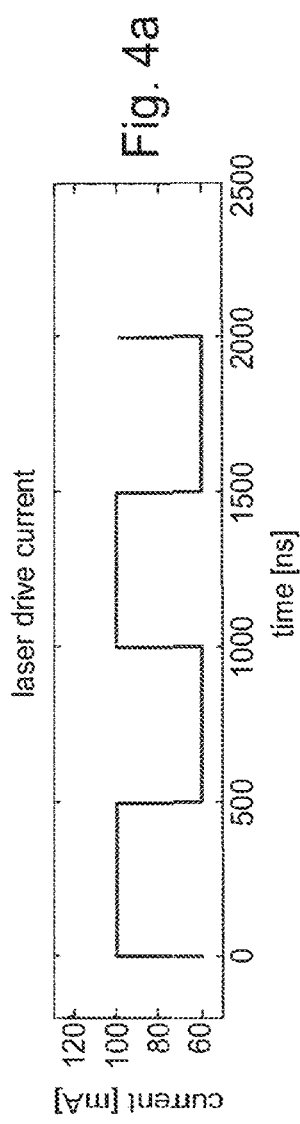
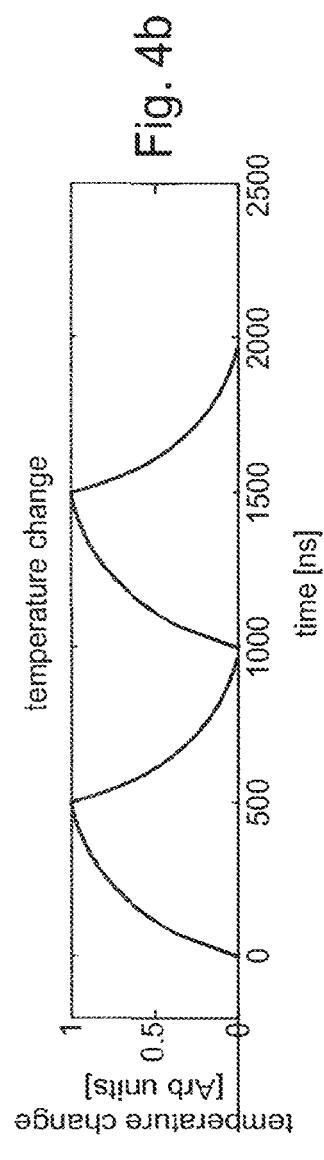
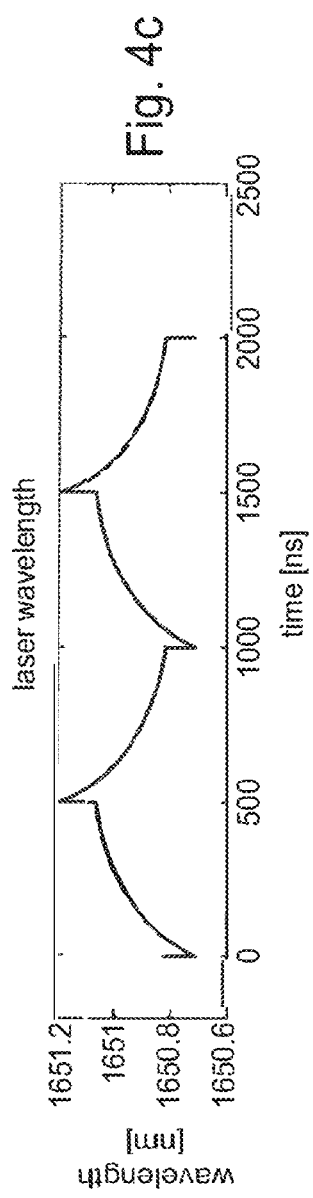

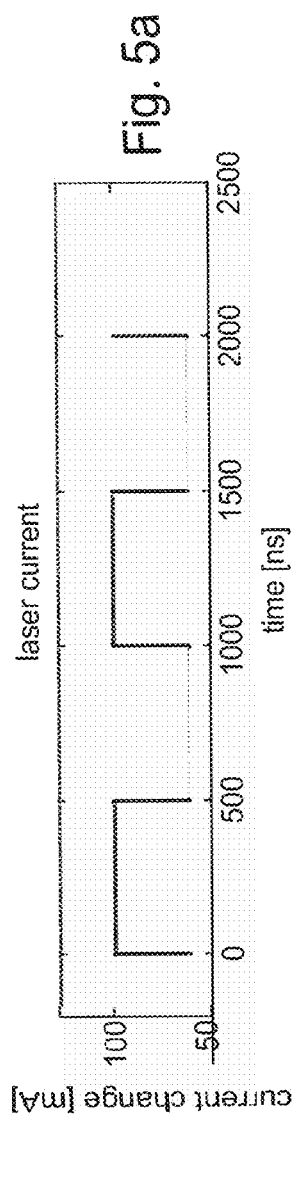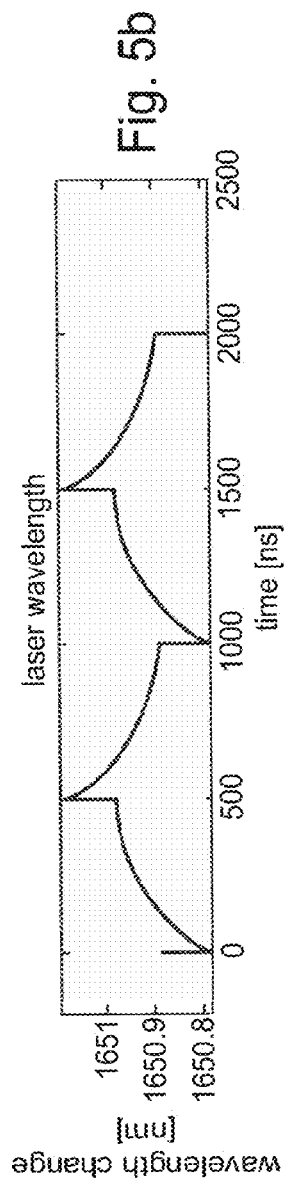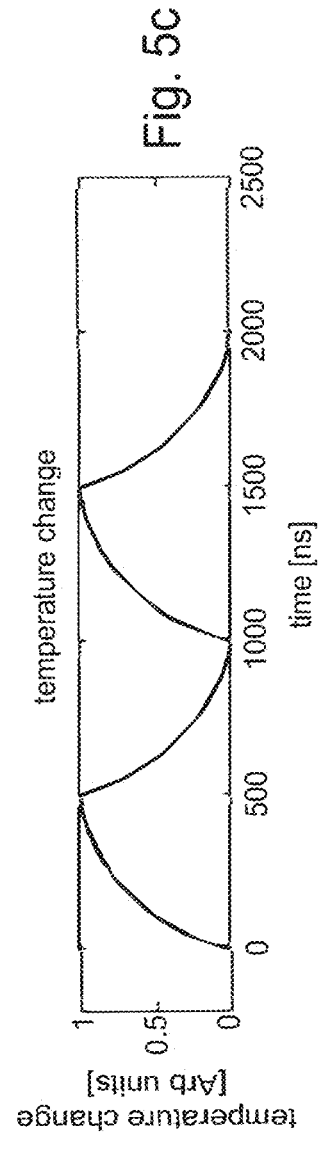

RAPIDLY TUNEABLE DIODE LIDAR

FIELD OF THE INVENTION

The present invention relates particularly, but not exclusively, to an optical device and associated methods of use. The present invention also relates particularly, but not exclusively, to an optical device for detecting the presence or concentration of gas in the atmosphere, and to improvements in lidar-based devices and methods.

BACKGROUND TO THE INVENTION

Optical devices, such as laser-based optical devices, are often used to detect a substance, such as an atmospheric gas. Typically, such optical devices can be used to scan an area to determine the presence of a gas.

Some known optical devices, such as differential absorption lidar systems (DIAL), typically work by outputting pulsed radiation at an "on" wavelength (associated with a particular feature of a gas, such as the absorption coefficient) and an "off" wavelength, relatively far removed from the "on" wavelength. However, such systems suffer from a number of drawbacks, such as the complex and, often, expensive components required to implement the "on" and "off" wavelength locking. Furthermore, the high peak power of such pulsed systems can damage the optical components thereof. Moreover, such pulsed systems results in low wall-plug efficiencies, at least when using pulsed laser(s) to provide the "on" and "off" output radiation.

WO 2019/013698 discloses a DIAL lidar system. A narrowband tuneable light source could be used to scan a wavelength range of 760 nm to 763 nm. However, WO 2019/013698 fails to disclose a continuous scan rate of the light source.

WO 2005/047871 discloses a system for chemical identification of a medium. The system includes a laser for generating a continuous wave (CW) carrier, a digital encoder for forming an encoded word, and an electro-optic (EO) modulator for modulating the CW carrier with the encoded word to form an encoded CW carrier. The encoded CW carrier is propagated through the medium. The system also includes a receiver configured to detect the propagated, encoded CW carrier to form a detected signal, and a processor configured to measure bit error rate (BER) of the detected signal and identify the medium based on the measured BER. The digital encoder may be configured to form at least one pseudonoise (PN) encoded word. The processor may measure the BER of the detected signal based on the PN encoded word. WO 2005/047871 discloses the system could scan the wavelength of the laser device at a rate of approximately 10 Hz.

US 2003/0030001 discloses a method and apparatus for remote detection of gas, preferably methane, dispersed into the atmosphere. The method utilizes a tuneable diode laser (TDL)-based lidar, utilizing a TDL whose frequency can be altered by changing the TDL drive current. The TDL laser is driven by a drive current or carrier, and the carrier frequency is preferably centred in the centre of the absorption line of the gas in issue. A small RF modulation current (preferably at 4 MHz) is superimposed on the TDL carrier frequency to produce sidebands, which lie within the pressure broadened absorption line of the gas. A low frequency (about 1 KHz) sawtooth ramp current is also superimposed on the TDL drive current to sweep the carrier and its associated sidebands over a range, and the range preferably is twice as wide as, and centred on, the atmosphere-pressure broadened absorption line width of the gas.

US 2018/0058935 discloses a space-borne remote sensing technique that enables the acquisition of global sodium (Na) density, temperature, and wind measurements in the mesospheric and lower thermosphere (MLT), with the spatial and temporal resolution required to resolve issues associated with the structure, chemistry, dynamics, and energetics of the MLT region. In one embodiment, the invention relates to a lidar instrument including a laser transmitter to remotely measure the Na layer and the composition and dynamics of Earth's mesosphere. US 2018/0058935 fails to disclose continuous scanning of the laser transmitter.

US 2016/0334507 discloses a system for simultaneous optical pathlength determination and remote chemical sensing of a sample disposed along an optical path. The system includes a modulated laser source configured for modulated light emission so that at least one spectral sideband with a sideband frequency is created, the modulated laser source being configured to direct the modulated light emission along the optical path and vary the sideband frequency over time. A detector is configured to detect transmitted light along the optical path and generate a detected light intensity signal. A frequency down-converter is configured to receive the detected light emission signal and generate a frequency down-converted light intensity signal. A demodulator is configured to demodulate the frequency of the down-converted light intensity signal and output an instantaneous frequency. A pathlength calculator is configured to determine an optical pathlength to the sample based on the instantaneous frequency. A frequency down-converted light intensity signal is simultaneously output for spectroscopic chemical sensing.

US 2016/0334507 fails to disclose a continuous scan rate of the output wavelength of the laser source.

The inventors have appreciated the shortcomings in such known optical devices.

According to a first aspect of the present invention there is provided an optical device,
  wherein the optical device is operable to output first output radiation, wherein the first output radiation comprises a continuous wave output;
  wherein the optical device is operable to tune a first emission wavelength of the first output radiation continuously within a first wavelength spectrum, the first wavelength spectrum comprising a first spectral feature associated with a first characteristic of a first substance;
  wherein the optical device is operable to apply a first output modulation to the first output radiation;
  wherein the optical device is operable to transmit the first output radiation towards a first target location and to collect or receive scattered radiation, the scattered radiation having been at least partially modified by the first substance in the first target location, and
  wherein the optical device is operable to process the received scattered radiation.

The optical device may be configured to detect one or more substances. The optical device may be configured to detect a plurality of substances. The optical device may be configured to detect the presence of one or more substances in one or more target locations, or environments. The optical device may be configured to measure the concentration of one or more substances. The optical device may be configured to detect the presence, or concentration, of the, or each, substance in the atmosphere.

The optical device may be configured to detect the presence, or concentration, of the, or each, substance when the, or each, substance is located remote from the optical device. The optical device may be configured to detect the presence, or concentration, of the, or each, substance when the, or each, substance is located at a distance of up to approximately 200 km, optionally up to approximately 100 km, optionally up to approximately 100 metres from the optical device.

The first substance may be a gas. At least one of the substances may be a gas. The, or each, substance may be a gas. The, or each, substance may be one or more gases, liquids, solids and/or plasmas. The optical device may be configured to detect one or more gases. The optical device may be configured to detect one or more gases present in at least a part of the atmosphere. The, or each, substance may be at least one of: carbon dioxide ($CO_2$), nitrous oxide ($N_2O$), carbon monoxide (CO), ammonia ($NH_3$), ethylene ($C_2H_4$) and methane ($CH_4$).

The optical device may be operable to perform one or more scans of the first target location. The optical device may be operable to perform one or more scans of one or more target locations. The optical device may be operable to transmit the first output radiation to one or more target locations. The optical device may be operable to transmit the first output radiation to a plurality of target locations. At least two of the target locations may be adjacent to each other. The target locations may be remote from each other. The optical device may be operable to scan at least a part of the atmosphere. The optical device may be operable to perform one or more scans of one or more atmospheric target locations.

In this arrangement, the optical device is operable to obtain measurement data associated with at least one substance in at least two dimensions of space, by scanning one or more target locations. The scan may include one or more two-dimensional scans and/or one or more three-dimensional scans. The device may be movable to one or more target locations.

The optical device may be configured as a Lidar device. The optical device may be operable to perform one or more Lidar scans. The optical device may be operable to measure the distance between at least a part of the optical device and one or more targets, objects, substances, or the like. The optical device may be operable to measure the volume of one or more targets, objects, substances, or the like. The optical device may be operable to measure a cross-sectional area of one or more targets, objects, substances, or the like. The optical device may be operable to measure a trajectory of one or more targets, objects, substances, or the like. The optical device may be operable to locate, or detect, one or more sources of one or more targets, objects, substances, or the like. The source may be a source of one or more gases.

The optical device may be operable to output one or more different types of output radiation, wherein each output radiation comprises a continuous wave output. The optical device may be operable to output a plurality of different types of output radiation, wherein each output radiation comprises a continuous wave output. The optical device may be operable to receive one or more types of scattered radiation, the, or each, scattered radiation being associated with a type of output radiation. The optical device may be operable to receive a plurality of types of scattered radiation, each type of scattered radiation being associated with a type of output radiation. The optical device may be operable to receive a plurality of types of scattered radiation, the plurality of types of scattered radiation including at least one of: specular or diffuse, and each type of scattered radiation being associated with a type of output radiation.

The optical device may be operable to output first output radiation in the infrared, visible, ultraviolet, and/or the microwave region of the electromagnetic spectrum. The optical device may be operable to output first output radiation in the terahertz region of the electromagnetic spectrum. The optical device may be operable to output one or more types of output radiation in the infrared, visible, ultraviolet, and/or the microwave region of the electromagnetic spectrum. The optical device may be operable to output first output radiation having a wavelength of between approximately 1.65 µm and 1.652 µm, optionally between approximately 1.6506 µm and approximately 1.6512 µm.

The optical device may be operable to receive or collect scattered radiation in the infrared, visible, ultraviolet, and/or the microwave region of the electromagnetic spectrum. The optical device may be operable to receive or collect scattered radiation having a wavelength of between 1.65 µm and 1.652 µm, optionally between approximately 1.6506 µm and approximately 1.6512 µm.

The first output radiation comprises a continuous wave (CW) output and the optical device may be operable to apply a first output random or quasi-random modulation (RM) to the first output radiation. In this arrangement, the optical device is a CW-RM device. The first optical device may be configured to be a CW-RM Lidar device.

The first spectral feature may be associated with an electromagnetic transmission coefficient of the first substance. The first spectral feature may be associated with an electromagnetic absorption coefficient of the first substance. The first spectral feature may be associated with the absorption coefficient of at least one substance. The first spectral feature may be associated with the absorption coefficient of at least one gas. The first spectral feature may be associated with the transmission coefficient of at least one gas.

The optical device may be operable to tune the first emission wavelength of the first output radiation continuously within a first wavelength spectrum, the first wavelength spectrum comprising one or more, or a plurality of, spectral features associated with one or more, or a plurality of, characteristics of at least one substance.

The optical device may be operable to tune a plurality of emission wavelengths of a plurality of output radiation continuously within a plurality of wavelength spectra. Each wavelength spectra may comprise one of more, or a plurality of, spectral features associated with one or more, or a plurality of, characteristics of one or more substances.

The optical device may be configured to process received scattered radiation and to fit the processed data to one or more measured absorption spectra to detect the presence, or concentration, of one or more substances.

The optical device may comprise one or more laser devices. The optical device may comprise a plurality of laser devices. The optical device may comprise a single laser device. The, or each, laser device may be operable to output the first output radiation. Each laser device may be operable to output radiation in an associated wavelength spectrum. The optical device may comprise a plurality of laser devices, with each single laser device being associated with a unique wavelength spectrum, such that no two laser devices are configured to output the same wavelength spectrum.

The optical device may comprise one or more laser devices, and the optical device may be operable to tune the emission wavelength of the, or each laser device continuously within a wavelength spectrum. Each wavelength spectrum of each laser device may comprise one or more spectral features associated with one or more characteristics of one or more substances.

The optical device may comprise one or more control elements. The optical device may comprise a plurality of control elements.

The optical device may comprise one or more modulators. The optical device may comprise a plurality of modulators. The optical device may comprise a single modulator. The, or each, modulator may be operable to apply the first output modulation to the first output radiation.

The optical device may comprise one or more optical transceiver systems. The optical device may comprise a plurality of optical transceiver systems. The optical device may comprise a single optical transceiver system. The optical transceiver system may be operable to transmit the first output radiation. The optical transceiver system may be operable to receive the scattered radiation. The optical transceiver system may be operable to transmit the first output radiation and to receive the scattered radiation. The optical device may comprise a single optical transceiver system and the single optical transceiver system may be operable to transmit the first output radiation and to receive the scattered radiation. The optical transceiver system may be operable to transmit the first output radiation to the first target location.

The optical transceiver system may be operable to transmit a plurality of types of output radiation. The optical transceiver system may be operable to receive a plurality of scattered radiation. In this arrangement, the optical transceiver system is operable to transmit a plurality of types of output radiation having different wavelengths and to receive a plurality of corresponding scattered radiation having different wavelengths.

The optical transceiver system may comprise one or more transmitter modules and one or more receiver modules. The optical transceiver system may include a common transmitter and receiver module. The optical transceiver system may include a discrete transmitter module and a discrete receiver module. The transmitter module and the receiver module may be arranged to be coaxial. The transmitter module and the receiver module may be arranged to be confocal. The transmitter module and the receiver module may be integrally formed. The transmitter module and the receiver module may be configured as a single transceiver module.

The optical transceiver system may comprise one or more telescope devices. The transmitter module may comprise a telescope device. The receiver module may comprise a telescope device. The transmitter module and the receiver module may be formed by one or more telescope devices. The transmitter module and the receiver module may be formed from a single telescope device.

The optical device may comprise one or more detectors. The optical device may comprise a plurality of detectors. The optical device may comprise a single detector. The detector may be an optical detector. The detector may be a photodetector. The detector may be configured to receive electromagnetic radiation. The detector may be operable to receive the scattered radiation. The detector may be operable to receive the scattered radiation via the optical transceiver system.

The optical device may comprise one or more processing elements. The optical device may comprise a plurality of processing elements. The, or each, processing element may be operable to process the received scattered radiation received or collected by the detector.

The optical device may be configured to be mountable to a frame member, a vehicle, an aerial vehicle, an unmanned vehicle, an unmanned aerial vehicle, and/or a helicopter. The optical device may be mountable to a satellite apparatus. The optical device may be configured to be a portable device. The optical device may be configured to be a lightweight device.

The optical device may include one or more optical guide elements. The optical guide elements may be configured to guide the received scattered radiation to the, or each, detector. The optical guide elements may be configured to direct the received scattered radiation from the optical transceiver system to the detector. The optical guide elements may be configured to direct the received scattered radiation away from the modulator and/or the laser device.

The laser device may be a tuneable laser device. In this arrangement, the emission wavelength of the laser device is tuneable.

The drive current of the laser device may be configured to be adjustable. The laser device may be configured to output the first output radiation at one or more drive currents. The emission wavelength of the first output radiation may be determined, at least in part, by the laser drive current. The laser device may be configured such that changing the laser drive current causes the temperature of the active region of the laser device to change. The laser device may be configured such that changing the laser drive current causes the temperature of the active region of the laser device to change, the temperature change lasting less than 1 µs. The temperature change of the active region of the laser may be non-linear. In this example, the temperature change of the laser could be highly repeatable. The mathematical relationship of the laser drive current, the change in temperature of the active region of the laser device, and the emission wavelength of the laser device can be analysed and exploited to allow rapid tuning of the emission wavelength, which is highly repeatable and stable.

The laser device may be a semiconductor laser device. The laser device may be a diode laser device. The laser device may be a narrow-linewidth laser device. The laser device may be a distributed feedback (DFB) laser device. The laser device may be an indium phosphide laser device.

The laser device may be operable to output first output radiation at one or more wavelengths. The laser device may be operable to output first output radiation at a plurality of wavelengths. The laser device may be operable to output first output radiation at one or more wavelengths in the infrared, visible, ultraviolet, and/or microwave regions of the electromagnetic spectrum. The laser device may be operable to output first radiation in the short-wave infrared region of the electromagnetic spectrum.

The laser device may be operable to receive one or more signals from the control element. The laser device may be operable to receive one or more signals from the control element, and the laser device may be operable to adjust the laser drive current based, at least in part, on the signals received from the control element.

The optical device may be operable to scan the first wavelength spectrum at a frequency of at least approximately 90 KHz, or at least approximately 100 KHz, or at least approximately 180 KHz, or at least approximately 200 kHz, or at least approximately 1 MHz, or at least approximately 2 MHz, or at least approximately 100 MHz, or at least approximately 200 MHz. The optical device may be operable to scan the first wavelength spectrum at a frequency of between approximately 90 kHz and approximately 200 MHZ, optionally between approximately 100 kHz and approximately 100 MHZ, optionally between approximately 100 kHz and approximately 2 MHz, optionally between approximately 100 kHz and approximately 1 MHz, optionally between approximately 200 kHz and approximately 1 MHZ, optionally between approximately 200 kHz and approximately 2 MHz. In this arrangement, the optical device is operable to sweep the emission wavelength of the first output radiation continuously from the minimum wavelength of the first wavelength spectrum to the maximum wavelength of the first wavelength spectrum at a frequency of at least approximately 90 kHz, or at least approximately 100 kHz, or at least approximately 180 KHz, or at least approximately 200 kHz, or at least approximately 1 MHz, or at least approximately 2 MHz, or at least approximately 100 MHz, or at least approximately 200 MHz.

The optical device may be operable to tune the emission wavelength of the first output radiation at a rate of at least 1 μm per second. The optical device may be operable to tune the emission wavelength of the first output radiation at a rate of at least 1 mm per second. The optical device may be operable to tune the emission wavelength of the first output radiation at a rate of at least 10 mm per second. The optical device may be operable to tune the emission wavelength of the first output radiation at a rate of at least 10 m per second.

The optical device may be operable to tune the emission wavelength of the first output radiation at a rate of between 1 μm per second and 10 m per second, optionally between 1 μm per second and 1 mm per second, optionally between 1 μm per second and 10 mm per second, optionally between 1 mm per second and 10 mm per second, optionally between 1 mm per second and 10 m per second.

The first wavelength spectrum may have a wavelength range of at least approximately 10 μm. The first wavelength spectrum may have a wavelength range of at least approximately 100 nm. The first wavelength spectrum may have a wavelength range of between approximately 10 μm and approximately 100 nm.

The optical device may be operable to scan the first wavelength spectrum at a frequency of 100 KHz and the first wavelength spectrum may have a wavelength range of 10 μm. In this arrangement, the optical device is operable to scan the first wavelength spectrum at a rate of 1 μm per second.

The optical device may be operable to scan the first wavelength spectrum at a frequency of 100 MHz and the first wavelength spectrum may have a wavelength range of 10 μm. In this arrangement, the optical device is operable to scan the first wavelength spectrum at a rate of 1 mm per second.

The optical device may be operable to scan the first wavelength spectrum at a frequency of 100 kHz and the first wavelength spectrum may have a wavelength range of 100 nm. In this arrangement, the optical device is operable to scan the first wavelength spectrum at a rate of 10 mm per second.

The optical device may be operable to scan the first wavelength spectrum at a frequency of 100 MHz and the first wavelength spectrum may have a wavelength range of 100 nm. In this arrangement, the optical device is operable to scan the first wavelength spectrum at a rate of 10 m per second.

The optical device may be operable to continuously tune the first emission wavelength within the first wavelength spectrum and to perform multiple scans within the first wavelength spectrum. In this arrangement, the optical device is operable to continuously scan the first wavelength spectrum.

The first wavelength spectrum may include one or more spectral features associated with one or more characteristics of the first substance. The optical device may be operable to tune the first emission wavelength of the first output radiation to be at an emission wavelength that is not associated with the, or each, spectral feature, and to tune the first emission wavelength of the first output radiation to be at an emission wavelength that is associated with at least one of the spectral features. In this arrangement, the optical device is operable to output first output radiation at one or more "off" wavelengths and one or more "on" wavelengths. The optical device is operable to continuously tune the first emission wavelength between the one or more "off" wavelengths and the one or more "on" wavelengths.

The control element may be operable to tune the first emission wavelength of the first output radiation continuously within the first wavelength spectrum. The control element may be operable to cause the laser device to tune the first emission wavelength of the first output radiation continuously within the first wavelength spectrum. In this arrangement, the control element is operable to continuously tune the emission wavelength within the first wavelength spectrum, such that the emission wavelength varies continuously over time.

The control element may be configured to tune the emission wavelength of the first output radiation in a non-linear manner over time.

The control element may be an electronic control element, module, or the like. The, or each, control element may be operable to tune the first emission wavelength of the first output radiation continuously within a first wavelength spectrum, the first wavelength spectrum comprising a first spectral feature associated with a first characteristic of the first substance. The control element may be configured to control at least one operating parameter of the, or each, laser device. The control element may be configured to tune the first drive current of the laser device. The control element may be configured to adjust the first drive current of the laser device between a plurality of discrete drive current values.

The control element may be configured to tune the drive current of the laser device at a frequency of at least approximately 90 kHz, or at least approximately 100 kHz, or at least approximately 200 kHz, or at least approximately 100 MHz, or at least approximately 200 MHz. The optical device may be operable to scan the first wavelength spectrum at a frequency of between approximately 90 KHz and approximately 200 MHZ, optionally between approximately 100 KHz and approximately 100 MHz, optionally between approximately 100 kHz and approximately 2 MHz, optionally between approximately 100 kHz and approximately 1 MHz, optionally between approximately 200 kHz and approximately 1 MHZ, optionally between approximately 200 kHz and approximately 2 MHz. The control element may be operable to tune the drive current of the laser device using a square wave signal. The square wave signal may have a duty cycle of approximately 50%. The control element may be operable to tune the drive current of the laser device between approximately 80 mA and approximately 120 mA, optionally between approximately 60 mA and approximately 100 mA, optionally between approximately 60 mA and approximately 120 mA.

The control element may be operable to provide control data to the modulator. The modulator may be configured to apply the first output modulation to the first output radiation based, at least in part, on the control data received from the control element.

The modulator may include one or more optical amplifiers, electro-optic modulators, acousto-optic modulators and/ or semiconductor optical amplifiers (SOA). The modulator may be configured to output the modulated first output radiation.

The first output modulation may include a random or quasi-random modulation element. The first output modulation may include a binary modulation element. The first output modulation may comprise a first plurality of binary pulses. The first output modulation may include a digital modulation element. The first output modulation may include an on/off modulation element. The first output modulation may include a substantially square-wave modulation element.

The first output modulation may comprise a plurality of pulses, the first plurality of pulses may comprise at least one of: a plurality of pulses in a random pulse sequence; a plurality of pulses in a pseudo-random sequence; or a plurality of pulses in a predefined sequence.

The first output modulation may include a modulation frequency of at least approximately 10 MHz, optionally at least approximately 33 MHz. The first output modulation may include a substantially square-wave modulation element having a duty cycle of approximately 50%.

The optical device may be operable to apply the first output modulation to the first output radiation using an amplitude modulation process. The optical device may be operable to apply the first output modulation to the first output radiation by adjusting the power level of the first output radiation.

The detector may be an electronic detector. The detector may include one or more semiconductor-based detector devices. The detector may include one or more single-photon detector devices. The detector may include one or more single-photon avalanche diodes (SPADs). The, or each, SPAD may be configured to operate in Geiger mode. The detector may include one or more avalanche photodiodes (APDs). The detector may include one or more linear-mode APDs. The detector may include one or more silicon-based detector devices. The detector may include one or more indium gallium arsenide-based detector devices.

The detector may include one or more CMOS devices. In this arrangement, at least a part of the detector is manufactured using a CMOS manufacturing process.

The detector may be operable to receive the scattered electromagnetic radiation received by the optical device. The detector may be arranged to collect at least some of the scattered electromagnetic radiation received by the optical device. The detector may be operable to receive the scattered electromagnetic radiation in the infrared region of the electromagnetic spectrum.

The detector may be configured to send detector data to the processing element. The detector data may be associated with at least one property of the received electromagnetic radiation. The detector may be operable to receive scattered electromagnetic radiation and to provide one or more signals indicative of the properties of the received scattered radiation to the processing element.

The processing element may include an electronic processing element. The processing element may be operable to receive and process detector data from the detector. The processing element may be operable to apply random or quasi-random modulation continuous wave (RM-CW) analysis to the detector data to determine the presence of, or concentration of, one or more substances in the first target area. The processing element may be operable to convert detector data into information regarding the presence or concentration of one or more substances in the first target area. The processing element may be operable to use a random or quasi-random modulation continuous wave Lidar gas absorption detection technique to process the detector data.

The optical device may be operable to correlate received scattered radiation with the transmitted first output radiation using one or more correlation techniques. The processing element may be operable to correlate received scattered radiation with the transmitted first output radiation using one or more correlation techniques.

The optical device may be operable to process and/or display data associated with the received scattered radiation in the time domain.

According to a second aspect of the present invention there is provided a method of operating an optical device, the method comprising the steps of:
   tuning a first emission wavelength of a first output radiation of a laser device continuously within a first wavelength spectrum, the first wavelength spectrum comprising a first spectral feature associated with a first characteristic of a first substance;
   modulating the first output radiation of the laser device with a first output modulation;
   projecting the first output radiation towards a first target area;
   receiving scattered radiation from the first target area; and
   processing the scattered radiation.

Embodiments of the second aspect of the present invention may include one or more features of the first aspect of the present invention or its embodiments. Similarly, embodiments of the first aspect of the present invention may include one or more features of the second aspect of the present invention or its embodiments.

According to a third aspect of the present invention there is provided a method of transmitting electromagnetic radiation, the method comprising the steps of:
   tuning a first emission wavelength of a first output radiation of an electromagnetic radiation source continuously within a first wavelength spectrum, the first wavelength spectrum comprising a first spectral feature associated with a first characteristic of a first substance;
   modulating the first output radiation of the electromagnetic radiation source with a first output modulation; and
   projecting the first output radiation towards a first target area.

The electromagnetic radiation source may comprise one or more laser devices.

Embodiments of the third aspect of the present invention may include one or more features of the first and/or second aspects of the present invention or their embodiments. Similarly, embodiments of the first and/or second aspects of the present invention may include one or more features of the third aspect of the present invention or its embodiments.

According to a fourth aspect of the present invention there is provided a method of receiving electromagnetic radiation, the method comprising the steps of:
   receiving scattered electromagnetic radiation from a first target area, wherein the scattered electromagnetic radiation is provided by:
      tuning a first emission wavelength of a first output radiation of an electromagnetic radiation source continuously within a first wavelength spectrum, the first wavelength spectrum comprising a first spectral feature associated with a first characteristic of a first substance;

modulating the first output radiation of the electromagnetic radiation source with a first output modulation; and projecting the first output radiation towards a first target area; and processing the scattered radiation.

The electromagnetic radiation source may comprise one or more laser devices.

Embodiments of the fourth aspect of the present invention may include one or more features of the first, second and/or third aspects of the present invention or their embodiments. Similarly, embodiments of the first, second, and/or third aspects of the present invention may include one or more features of the fourth aspect of the present invention or its embodiments.

According to a fifth aspect of the present invention there is provided a method of transmitting and receiving electromagnetic radiation, the method comprising the steps of:

tuning a first emission wavelength of a first output radiation of an electromagnetic radiation source continuously within a first wavelength spectrum, the first wavelength spectrum comprising a first spectral feature associated with a first characteristic of a first substance;

modulating the first output radiation of the electromagnetic radiation source with a first output modulation;

projecting the first output radiation towards a first target area;

receiving scattered radiation from the first target area; and processing the scattered radiation.

The electromagnetic radiation source may comprise one or more laser devices.

Embodiments of the fifth aspect of the present invention may include one or more features of the first, second, third and/or fourth aspects of the present invention or their embodiments. Similarly, embodiments of the first, second, third and/or fourth aspects of the present invention may include one or more features of the fifth aspect of the present invention or its embodiments.

According to a sixth aspect of the present invention there is provided a computer program product comprising machine-readable instructions that, when run, are configured to implement the method of the first aspect of the invention.

Embodiments of the sixth aspect of the present invention may include one or more features of the first, second, third, fourth and/or fifth aspects of the present invention or their embodiments. Similarly, embodiments of the first, second, third, fourth and/or fifth aspects of the present invention may include one or more features of the sixth aspect of the present invention or its embodiments.

According to a seventh aspect of the present invention there is provided a gas detection device, comprising:

a laser device operable to output first output radiation, wherein the first output radiation comprises a continuous wave output;

wherein the optical device is operable to tune a first emission wavelength of the first output radiation continuously within a first wavelength spectrum, the first wavelength spectrum comprising a first spectral feature associated with a first characteristic of a first gas;

wherein the optical device is operable to apply a first output modulation to the first output radiation;

wherein the optical device is operable to transmit the first output radiation towards a first target location and to collect/receive scattered radiation, the scattered radiation having been at least partially modified by the first gas in the first target location; and wherein the optical device is operable to process the received scattered radiation.

Embodiments of the seventh aspect of the present invention may include one or more features of the first, second, third, fourth, fifth and/or sixth aspects of the present invention or their embodiments. Similarly, embodiments of the first, second, third, fourth, fifth and/or sixth aspects of the present invention may include one or more features of the seventh aspect of the present invention or its embodiments.

According to an eighth aspect of the present invention there is provided an optical device, comprising:

a laser device operable to output first output radiation, wherein the first output radiation comprises a continuous wave output;

wherein the optical device is operable to tune a first emission wavelength of the first output radiation continuously within a first wavelength spectrum, the first wavelength spectrum comprising a first spectral feature associated with a first characteristic of a first substance;

wherein the optical device is operable to apply a first output modulation to the first output radiation, and wherein the optical device is operable to transmit the first output radiation towards a first target location.

Embodiments of the eighth aspect of the present invention may include one or more features of the first, second, third, fourth, fifth, sixth and/or seventh aspects of the present invention or their embodiments. Similarly, embodiments of the first, second, third, fourth, fifth, sixth and/or seventh aspects of the present invention may include one or more features of the eighth aspect of the present invention or its embodiments.

According to a ninth aspect of the present invention there is provided an optical device, wherein the optical device is operable to receive scattered radiation, the scattered radiation having been at least partially modified by a first substance in a first target location, the radiation being transmitted by:

a laser device operable to output first output radiation, wherein the first output radiation comprises a continuous wave output;

wherein the optical device is operable to tune a first emission wavelength of the first output radiation continuously within a first wavelength spectrum, the first wavelength spectrum comprising a first spectral feature associated with a first characteristic of a first substance;

wherein the optical device is operable to apply a first output modulation to the first output radiation;

wherein the optical device is operable to transmit the first output radiation towards the first target location; and wherein the optical device is operable to process the received scattered radiation.

Embodiments of the ninth aspect of the present invention may include one or more features of the first, second, third, fourth, fifth, sixth, seventh, and/or eighth aspects of the present invention or their embodiments. Similarly, embodiments of the first, second, third, fourth, fifth, sixth, seventh and/or eighth aspects of the present invention may include one or more features of the ninth aspect of the present invention or its embodiments.

According to a tenth aspect of the present invention, there is provided a device for transmitting electromagnetic radiation, comprising:

an electromagnetic radiation source operable to output first output radiation, wherein the first output radiation comprises a continuous wave output;

wherein the device is operable to tune a first emission wavelength of the first output radiation continuously within a first wavelength spectrum, the first wavelength spectrum comprising a first spectral feature associated with a first characteristic of a first substance;

wherein the device is operable to apply a first output modulation to the first output radiation;

wherein the device is operable to transmit the first output radiation towards a first target location.

The device may be operable to collect or receive scattered radiation, the scattered radiation having been at least partially modified by the first substance in the first target location.

The device may be operable to process the received scattered radiation.

Embodiments of the tenth aspect of the present invention may include one or more features of the first, second, third, fourth, fifth, sixth, seventh, eighth and/or ninth aspects of the present invention or their embodiments. Similarly, embodiments of the first, second, third, fourth, fifth, sixth, seventh, eighth and/or ninth aspects of the present invention may include one or more features of the tenth aspect of the present invention or its embodiments.

According to an eleventh aspect of the present invention there is provided a device for receiving electromagnetic radiation, wherein the device is operable to receive scattered radiation, the scattered radiation having been at least partially modified by a first substance in a first target location, the radiation being transmitted by:

an electromagnetic radiation source operable to output first output radiation, wherein the first output radiation comprises a continuous wave output;

wherein the device is operable to tune a first emission wavelength of the first output radiation continuously within a first wavelength spectrum, the first wavelength spectrum comprising a first spectral feature associated with a first characteristic of a first substance;

wherein the device is operable to apply a first output modulation to the first output radiation;

wherein the device is operable to transmit the first output radiation towards the first target location; and wherein the device is operable to process the received scattered radiation.

Embodiments of the eleventh aspect of the present invention may include one or more features of the first, second, third, fourth, fifth, sixth, seventh, eighth, ninth and/or tenth aspects of the present invention or their embodiments. Similarly, embodiments of the first, second, third, fourth, fifth, sixth, seventh, eighth, ninth and/or tenth aspects of the present invention may include one or more features of the eleventh aspect of the present invention or its embodiments.

According to a twelfth aspect of the present invention there is provided use of a signal, wherein the signal has been generated, created, transmitted and/or received using the method and/or apparatus of any one of the aspects of the present invention.

Embodiments of the twelfth aspect of the present invention may include one or more features of the first, second, third, fourth, fifth, sixth, seventh, eighth, ninth, tenth and/or eleventh aspects of the present invention or their embodiments. Similarly, embodiments of the first, second, third, fourth, fifth, sixth, seventh, eighth, ninth, tenth and/or eleventh aspects of the present invention may include one or more features of the twelfth aspect of the present invention or its embodiments.

According to a thirteenth aspect of the present invention there is provided a method of operating an optical device, the method comprising: tuning a first emission wavelength of a first output radiation of a laser device continuously within a first wavelength spectrum by modulating a drive current thereof with a first drive current modulation having a frequency of at least 100 KHz, the first wavelength spectrum comprising a first spectral feature associated with at least part of a gas absorption spectrum of at least one gas:

modulating the first output radiation of the laser device with a first output modulation, the first output modulation comprising a first plurality of binary pulses;

scanning the first wavelength spectrum at a rate of at least 1 µm per second;

projecting the first output radiation towards a first target area;

receiving scattered radiation from the first target area; and processing the scattered radiation.

Embodiments of the thirteenth aspect of the present invention may include one or more features of the first, second, third, fourth, fifth, sixth, seventh, eighth, ninth, tenth, eleventh and/or twelfth aspects of the present invention or their embodiments. Similarly, embodiments of the first, second, third, fourth, fifth, sixth, seventh, eighth, ninth, tenth, eleventh and/or twelfth aspects of the present invention may include one or more features of the thirteenth aspect of the present invention or its embodiments.

According to a fourteenth aspect of the present invention there is provided a gas detection device, comprising:

a laser device operable to output first output radiation, wherein the first output radiation comprises a continuous wave output;

a control element operable to tune a first emission wavelength of the first output radiation continuously within a first wavelength spectrum at a rate of at least 1 µm per second by modulating a drive current of the laser device with a first drive current modulation having a frequency of at least 100 KHz, the first wavelength spectrum comprising a first spectral feature associated with at least part of a gas absorption spectrum of at least one gas to be detected;

a modulator operable to apply a first output modulation to the first output radiation, the first output modulation comprising a first plurality of binary pulses;

an optical transceiver system operable to transmit the first output radiation towards a first target location and to collect scattered radiation, the scattered radiation having been at least partially modified by the, or each, gas in the first target location, a detector operable to receive the scattered radiation collected by the optical transceiver system; and a processing element operable to process the received scattered radiation.

Embodiments of the fourteenth aspect of the present invention may include one or more features of the first, second, third, fourth, fifth, sixth, seventh, eighth, ninth, tenth, eleventh, twelfth and/or thirteenth aspects of the present invention or their embodiments. Similarly, embodiments of the first, second, third, fourth, fifth, sixth, seventh, eighth, ninth, tenth, eleventh, twelfth and/or thirteenth aspects of the present invention may include one or more features of the fourteenth aspect of the present invention or its embodiments.

BRIEF DESCRIPTION OF THE DRAWINGS

Embodiments of the invention will now be described, by way of example, with reference to the drawings, in which:

FIGS. 4a to 4f show example waveforms of the operation of the optical device of FIG. 1;

FIG. 5a to 5f show further example waveforms of the operation of the optical device of FIG. 1.

DESCRIPTION OF PREFERRED EMBODIMENTS

With reference to FIGS. 1 to 6 an optical device 1 and associated waveforms of operation are shown.

Figure 1:
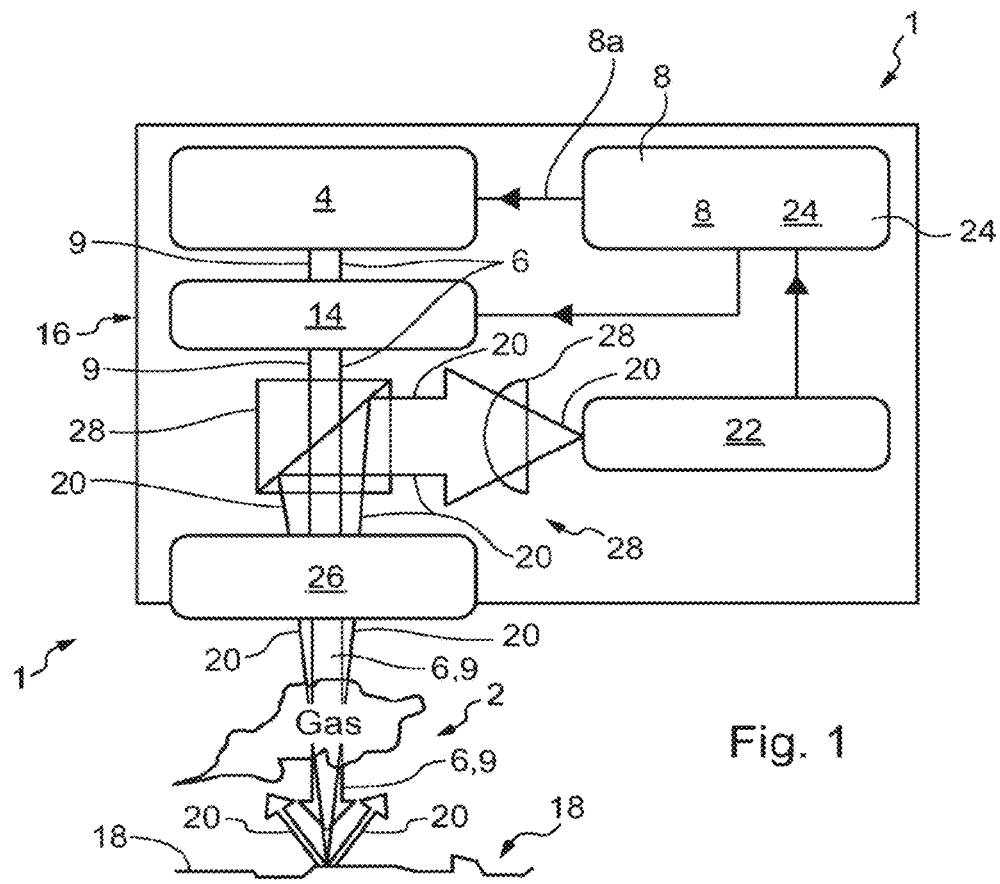
FIG. 1 shows a schematic of an optical device according to an embodiment of the present invention.

As shown in FIG. 1, the optical device 1 is a gas detection device configured to detect the presence or concentration of at least one gas 2 (an example of a substance). It should be appreciated that the optical device 1 could be used to detect other substances.

The optical device 1 includes a laser device 4 operable to output first output radiation 6 having a continuous wave output. The optical device 1 includes a control element 8 operable to tune a first emission wavelength 9 of the first output radiation 6 continuously within a first wavelength spectrum 10. That is, the control element 8 is operable to continuously tune the emission wavelength 9 between the minimum and maximum wavelengths of the first wavelength spectrum 10. Continuously tuning the emission wavelength 9 of the laser device 4 allows for fast scanning of an environment whilst reducing the spectral coherence of the transmitted radiation of the optical device 1.

The control element 8 is operable to continuously tune the first emission wavelength 9 within the first wavelength spectrum 10 and to perform multiple scans within the first wavelength spectrum 10. In this arrangement, the optical device 1 is operable to continuously scan the first wavelength spectrum 10, such that the emission wavelength 9 varies continuously over time.

Figure 3:
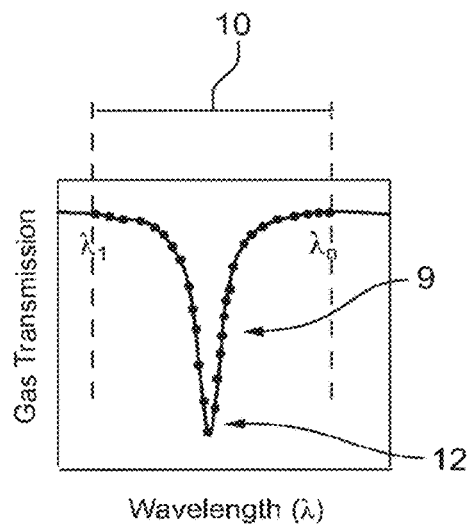
FIG. 3 shows an example wavelength spectrum of the optical device of FIG. 1.

As shown in FIG. 3, the first wavelength spectrum 10 comprises a first spectral feature 12 associated with a first characteristic of the gas 2 to be detected, which in this embodiment is a minimum value of the gas transmission spectrum of the gas 2 to be detected. It will be appreciated that the gas absorption spectrum of the gas 2 could also be used. Furthermore, other spectral features of a substance could be used.

Figure 2:
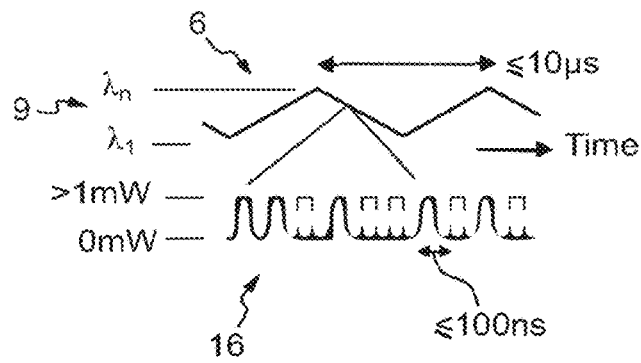
FIG. 2 shows example waveforms of the operation of the optical device of FIG. 1.

As shown in FIGS. 1 and 2, the optical device 1 includes a modulator 14 operable to apply a first output modulation 16 to the first output radiation 6.

The optical device 1 includes an optical transceiver system 26 operable to transmit the first output radiation 6 towards a first target location 18 and to collect/receive scattered radiation 20, the scattered radiation 20 having been at least partially modified by the gas 2 present in the first target location 18.

The optical device 1 includes a detector 22 configured to receive the scattered radiation 20 and a processing element 24 operable to process the received scattered radiation 20.

In the embodiments illustrated and described here, the optical device 1 is configured to detect the presence, or concentration, of the gas 2 in the atmosphere. However, it should be appreciated that the optical device 1 could be used to detect gas 2 in a chamber, a vessel, or the like. Furthermore, the optical device 1 could comprise an internal substance receptacle, vessel or the like, which could be used to test for the presence of one or more substances. It will be understood that in some embodiments, the optical device 1 could include a calibration element, which could include one or more gases, and used to calibrate the operation of the optical device 1.

In the embodiments illustrated and described here, the optical device 1 is configured to detect the presence, or concentration, of the gas 2 when located remote from the optical device 1, at a distance of up to approximately 100 metres. However, it should be appreciated that the optical device 1 could be configured to detect the gas 2 at other distances. For example, the optical device 1 could be mounted to a satellite and configured to operate at distances of up to 100 km or more. Furthermore, the optical device 1 could be configured to detect gas located within the optical device 1.

The optical device 1 is configured to detect methane ($CH_4$), although the optical device 1 could be configured to detect one or more gases. For example, the optical device 1 could be configured to detect at least one of: carbon dioxide ($CO_2$), nitrous oxide ($N_2O$), carbon monoxide (CO), ammonia ($NH_3$), ethylene ($C_2H_4$) and methane ($CH_4$), by, for example, changing the first wavelength spectrum 10 and/or including a plurality of laser devices 4 within the optical device 1, each laser device 4 being configured to tune its emission wavelength 9 around a spectral feature 12 of a gas 2 of interest.

In use, the optical device 1 is operable to perform one or more scans of the first target location 18. In this arrangement, the optical device 1 is operable to obtain measurement data associated with at least one substance in at least two dimensions of space, by scanning one or more target locations. To achieve this, the optical device 1 could be movable (e.g. by mounting on a vehicle) and/or the optical device 1 could include a scanning module configured to direct the transmitted radiation across an area to be scanned (and to collect the scattered radiation 20).

As shown in FIG. 1, the optical device 1 is configured as a Lidar device.

In the embodiments illustrated and described here, the optical device 1 is operable to output the first output radiation 6 in the infrared region of the electromagnetic spectrum, specifically at a wavelength of between approximately 1.6506 μm and 1.6512 μm. However, in other embodiments the optical device 1 could be operable to output the first output radiation 6 in one or more regions of the electromagnetic spectrum.

The first output radiation 6 comprises a continuous wave (CW) output and the modulator 14 is operable to apply a first output random or quasi-random modulation (RM) (an example of first output modulation 16) to the first output radiation 6. In this arrangement, the optical device 1 is a CW-RM device.

As shown in FIG. 1, the optical device 1 comprises a single laser device 4, and the emission wavelength 9 is continuously tuned within the wavelength spectrum 10, such that this single laser device 4 is used to generate both the "on" wavelength(s) and the "off" wavelength(s). That is, in this embodiment the optical device 1 does not require a plurality of laser devices 4 to scan the wavelength spectrum 10. It will be appreciated that in other embodiments, the optical device 1 could comprise a plurality of laser devices 4, used to scan multiple wavelength spectra 10 or, in some embodiments, to use more than one laser device 4 to scan within a particular wavelength spectrum 10 (e.g. using one laser device 4 to emit an "off" wavelength and another laser device 4 to emit an "on" wavelength).

In the embodiments illustrated and described here, the optical device 1 includes a single optical transceiver system 26 operable to transmit the first output radiation 6 and to receive the scattered radiation 20, and the optical device 1 is configured to be mountable to a frame member, a vehicle, an aerial vehicle, and/or an unmanned vehicle, an unmanned aerial vehicle, and/or a helicopter. The optical device 1 is configured to be a lightweight and portable device.

As shown in FIG. 1, the optical device 1 includes one or more optical guide elements 28 configured to guide the received scattered radiation 20 to the, or each, detector 22.

The laser device 4 is a tuneable laser device 4. In the embodiment illustrated in FIG. 1, the first emission wavelength 9 of the laser device 4 is tuneable by adjusting, or modulating, the drive current of the laser device 4, which in this embodiment is controlled by the control element 8 sending a drive current modulation 8a to the laser device 4. It will be appreciated that in some embodiments, the laser drive current could be provided directly from the control element 8, or via ancillary drive circuitry.

As shown in FIG. 4a, to 4c the laser device 4 is configured to output the first output radiation 6 at one or more drive currents FIG. 4a shows the drive current of the laser device 4 being adjusted by approximately 40 mA (between drive current values of 60 mA and 100 mA) using a square wave modulation having a duty cycle of 50% and a frequency of 1 MHz (that is, the frequency of the square wave signal is 1 MHz) That is, the drive current of the laser device 4 is increased by 40 mA for a period of 500 ns and is then decreased by 40 mA for 500 ns. This causes the temperature of the active region of the laser device 4 to increase (for an increase in laser drive current), shown in FIG. 4b. This in turn causes the emission wavelength 9 of the laser device 4 to increase, as shown in FIG. 4c. Thus, modulating the laser drive current using a square wave signal, causes the emission wavelength 9 to change in a non-linear manner. This makes the processing of the received scattered radiation 20 more complex, as fitting the received data to the transmitted wavelength is not thought to be as straightforward as for a linear change in emission wavelength 9 (which is common for devices which use a step change to adjust the emission wavelength 9). It will be apparent from FIGS. 4a to 4c that a single scan of the first wavelength spectrum 10 is achieved in 500 ns (from the minimum wavelength to the maximum wavelength). Thus, a single scan is achieved at a frequency of 2 MHz and, in this embodiment, at a scan rate of 0.8 μm per second. It will be appreciated that other scan rates, and drive currents could be used.

Scanning the wavelength spectrum 10 thus involves varying the emission wavelength 9 from the minimum value to the maximum value, and then from the maximum value to the minimum value, repeatedly. A relatively large number of data points can be gathered using this technique and at the possible scan frequencies outlined herein, even when moving the optical device 1 at high speed across an area to be scanned.

In the embodiments illustrated and described here, the emission wavelength 9 of the first output radiation 6 is determined, at least in part, by the laser drive current. It should be appreciated that other parameters could be taken into account when determining the desired emission wavelength 9, either alone or in combination with the laser drive current, Such as the ambient temperature, the range to the target, the properties of the environment (particularly the electromagnetic properties, such as the ambient light level) and/or the substance(s) to be detected.

In this embodiment, the laser device 4 is a diode laser device 4. However, it should be appreciated that the laser device 4 could be at least one of: a narrow-linewidth laser device, a distributed feedback (DFB) laser device and/or an indium phosphide laser device.

As shown in FIG. 3, the optical device 1 is operable to tune the first emission wavelength 9 of the first output radiation 6 to be at an emission wavelength 9 that is not associated with the, or each, spectral feature 12, and to tune the first emission wavelength 9 of the first output radiation 6 to be at an emission wavelength 9 that is associated with at least one of the spectral features 12. In this arrangement, the optical device 1 is operable to output first output radiation 6 at one or more "off" wavelengths and one or more "on" wavelengths. The optical device 1 is operable to continuously tune the first emission wavelength 9 between the one or more "off" wavelengths and the one or more "on" wavelengths, such that there is no step change between the "on" and "off" wavelengths, rather there is a smooth transition therebetween.

The control element 8 is an electronic control element 8 configured to control at least one operating parameter of the, or each, laser device 4 and the modulator 14. The control element 8 is operable to provide control data to the modulator 14 and the modulator 14 is configured to apply the first output modulation 16 to the first output radiation 6 based, at least in part, on the control data received from the control element 8.

In the embodiments illustrated and described here, the modulator 14 includes a semiconductor optical amplifier (SOA) configured to output the modulated first output radiation 6.

As shown in FIG. 2, the first output modulation 16 includes a random sequence of square-wave, binary pulses, applied to the first output radiation 6 using amplitude modulation. In this embodiment, the first output radiation 6 is modulated between essentially 0 mW of output power to greater than 1 mW of output power. The first output modulation 14 is applied with a frequency of at least 10 MHz. That is, the period of time between two pulses is 100 ns or less. The first output modulation 16 allows for matching of the received scattered radiation 20 with the corresponding transmitted radiation, particularly the wavelength thereof. It should be understood that whilst the output radiation 6 is modulated, the laser device 4 is continuously tuned. That is, the tuning of the laser device 4 is not interrupted while the modulation is applied to the output radiation 6 of the laser device 4.

Figure 4D:
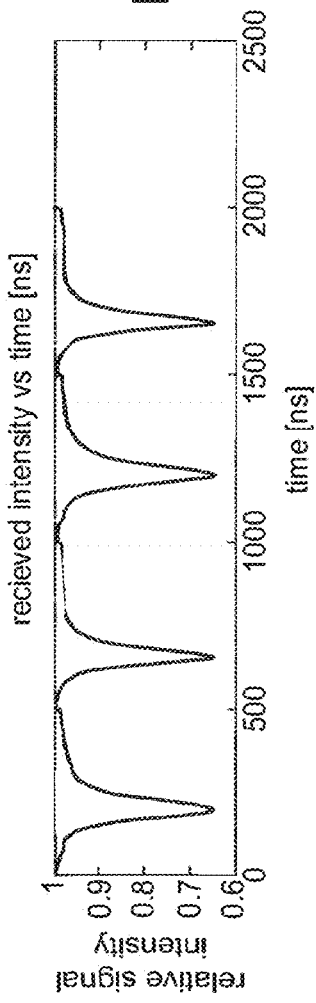

In the embodiments illustrated and described here, the detector 22 is a single-photon avalanche diode (SPAD). FIG. 4d shows a signal determined, at least in part, on the received scattered radiation 20 over time.

Figure 4E:
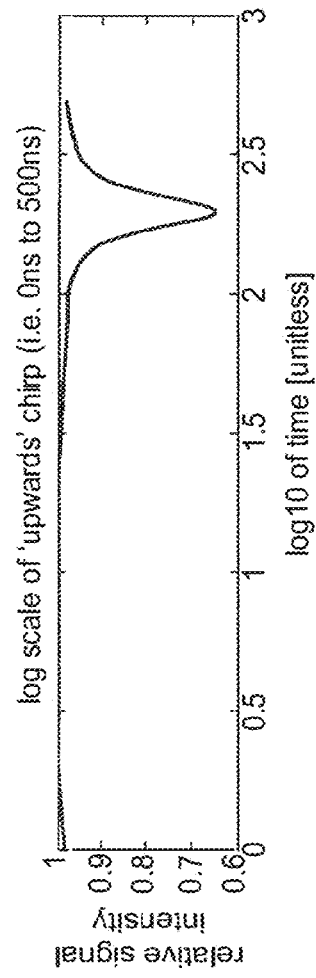

FIG. 4e shows a corrected plot used to account for the non-linear variation of the emission wavelength 9 of the laser device 4. FIG. 4e represents the period of 0 ns to 500 ns shown in FIGS. 4a to 4d.

Figure 4F:
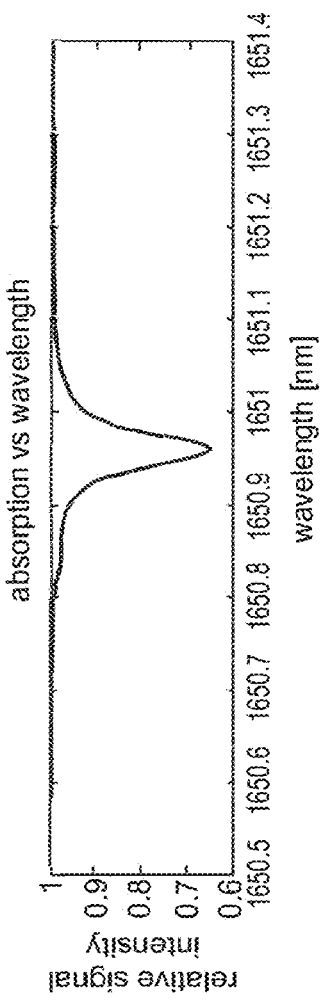
Figure 5D:
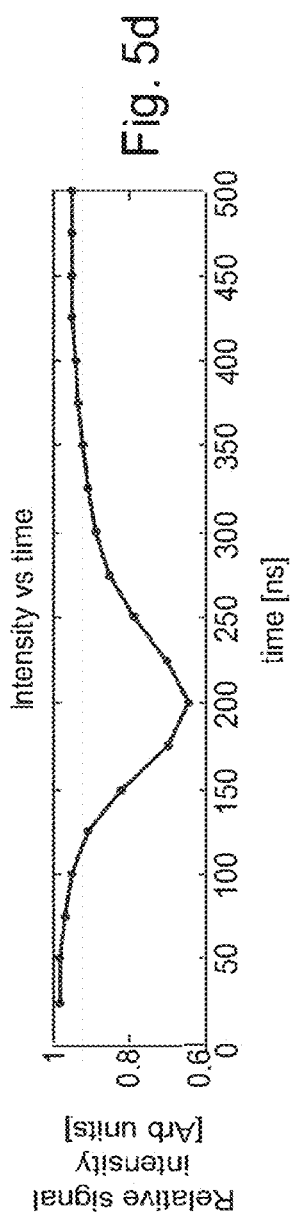
Figure 5E:
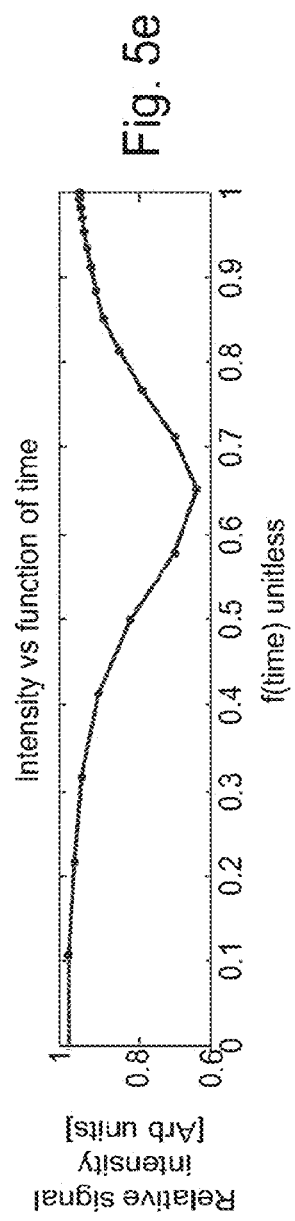
Figure 5F:
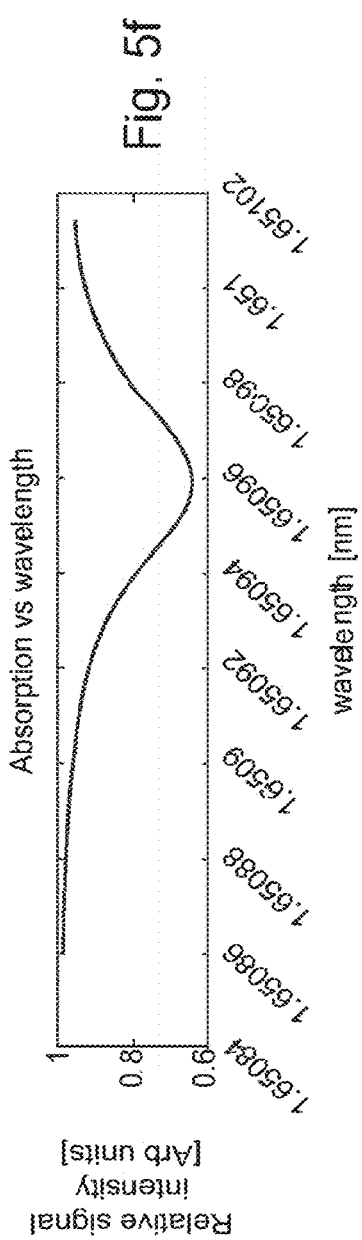

FIG. 4f shows the resultant plot of received intensity of the scattered radiation versus the emission wavelength 9 of the laser device 4, and thus shows absorption/transmission with respect to the emission wavelength 9.

FIGS. 5a to 5f show further example waveforms, obtained in a similar way to those shown in FIGS. 4a to 4f. The main difference between the two data sets is that FIG. 5e uses an empirically determined function related to the thermal characteristics of the laser device 4, rather than the logarithmic scale shown in FIG. 4e, in order to convert the time axis to a function that is approximately linearly proportional to the emission wavelength 9 of the laser device 4.

Figure 6:
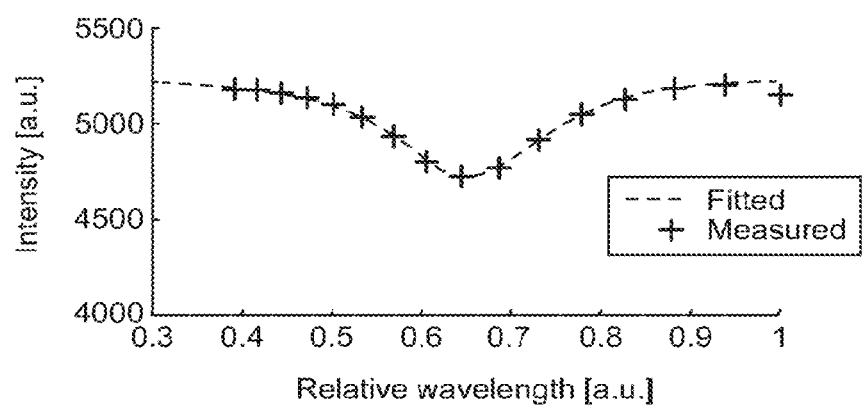
FIG. 6 shows a measured methane gas spectrum obtained using the optical device of FIG. 1.

FIG. 6 illustrates a measured methane ($CH_4$) gas spectrum obtained using the laser device 4. The measured methane spectrum is plotted against fitted data obtained by simulation.

The detector 22 is configured to send detector data to the processing element 24 and the detector data is associated with at least one property of the received electromagnetic radiation 20. Thus, the detector 22 is operable to receive scattered electromagnetic radiation 20 and to provide one or more signals indicative of the properties of the received scattered radiation 20 to the processing element 24.

The optical device 1 is configured to process received scattered radiation 20 and to fit the processed data to one or more measured absorption spectra to detect the presence, or concentration, of the gas 2 to be detected.

The processing element 24 is an electronic processing element 24, which in this embodiment is embedded with the control element 8. It will be understood that in other embodiments, the processing element 24 and the control element 8 could be entirely separate.

The processing element 24 is operable to receive and process detector data from the detector 22 and is operable to apply random or quasi-random modulation continuous wave (RM-CW) analysis to the detector data to determine the presence of, or concentration of, one or more substances in the first target location 18.

An example of how the present invention is used will now be provided, with reference to the embodiment illustrated in FIGS. 1 to 6.

Initially, a first wavelength spectrum 10 will be selected by configuring the optical device 1 through component selection (e.g. by the selection of a suitable laser device and a suitable optical transceiver system 26) and by component configuration (e.g. selecting the appropriate drive current values to be used during a scan, such as 60 mA to 100 mA). The laser device 4 is then used to output first output radiation 6, typically at the minimum wavelength of the wavelength spectrum 10, although the maximum wavelength, or another initial wavelength value could be used as the starting value.

Next, the control element 8 is used to continuously tune the laser device 4 by adjusting the drive current thereof. This results in the emission wavelength 9 being swept, or scanned, through the wavelength spectrum 10.

Whilst the laser device 4 is continuously scanned, output modulation 16 is applied to the output radiation 6 to produce a modulated output radiation 6, which is then projected to the target location 18 via the optical transceiver system 26. The output radiation 6 passes through the atmosphere and is attenuated by the gas 2 to be detected. The output radiation is then scattered by an object, such as the ground (an example of a first target location 18). At least some of the scattered radiation 20 is then received or collected by the same optical transceiver system 26.

The received scattered radiation 20 is then directed to the detector 22 via the optical guide elements 28, and the processing element 24 is then used to process the detector data.

When at least one scan of the wavelength spectrum 10 has been completed, the optical device 1 is then typically moved spatially to build up a two-dimensional or three-dimensional scan of an area. It will be appreciated that when the wavelength spectrum 10 is scanned relatively quickly (such as scanning at frequencies of at least 90 kHz), multiple data sets can be obtained for a fixed spatial point, depending on how fast the optical device 1 is moved.

Modifications and improvements may be made to the foregoing embodiment without departing from the scope of the invention.

For example, in other embodiments, the optical device 1 could be operable to scan the first wavelength spectrum 10 at a frequency of at least approximately 90 KHz, or at least approximately 100 kHz, or at least approximately 180 kHz, or at least approximately 200 kHz, or at least approximately 1 MHz, or at least approximately 2 MHz, or at least approximately 100 MHz, or at least approximately 200 MHz. The optical device could be operable to scan the first wavelength spectrum at a frequency of between approximately 90 kHz and approximately 200 MHZ, optionally between approximately 100 kHz and approximately 100 MHz. In this arrangement, the optical device 1 is operable to sweep the emission wavelength of the first output radiation continuously from the minimum wavelength of the first wavelength spectrum 10 to the maximum wavelength of the first wavelength spectrum 10 at a frequency of at least approximately 90 kHz, or at least approximately 100 kHz, or at least approximately 180 KHz, or at least approximately 200 kHz, or at least approximately 1 MHz, or at least approximately 2 MHz, or at least approximately 100 MHz, or at least approximately 200 MHz.

Furthermore, in other embodiments the first wavelength spectrum could have a wavelength range of between 10 μm and 100 nm. It will be understood that in other embodiments the first wavelength spectrum could have other suitable ranges of wavelengths.

The invention claimed is:

1. A method of operating an optical device, the method comprising:
    tuning a first emission wavelength of a first output radiation of a diode laser continuously within a first wavelength spectrum by modulating a drive current thereof with a first drive current modulation having a frequency of at least 100 kHz, the first wavelength spectrum comprising a first spectral feature associated with at least part of a gas absorption spectrum of at least one gas;
    modulating the first output radiation of the diode laser with a first output modulation, the first output modulation comprising a first plurality of binary pulses;
    scanning the first wavelength spectrum at a rate of at least 1 μm per second;
    transmitting the modulated first output radiation of the diode laser through optical guide elements in a three-dimensional scan towards a first target area;
    receiving scattered diode laser radiation from the first target area and directing it to a detector using at least one of said optical guide elements;
    processing the received scattered diode laser radiation by correlating the received scattered diode laser radiation with the transmitted first output radiation to create one or more correlated data sets; and
    forming an area scan of locations in the first target area to determine concentration of the at least one gas between the optical device and the locations,
        wherein multiple correlated data sets corresponding to fixed spatial points are used for determining concentration of the gas for each of the locations.

2. A method according to claim 1, wherein the step of scanning the first wavelength spectrum is carried out at a rate of between 1 μm per second and 10 m per second.

3. A method according to claim 1, wherein the first drive current modulation has a frequency of between 100 kHz and 100 MHz.

4. A method according to claim 1, wherein the first wavelength spectrum has a wavelength range of between 10 pm and 100 nm.

5. A method according to claim 1, wherein the first plurality of pulses comprises one of: a plurality of pulses in a random pulse sequence; a plurality of pulses in a pseudo-random sequence; or a plurality of pulses in a predefined sequence.

6. A method according to claim 1, wherein the first output modulation comprises a modulation frequency of at least 10 MHz.

7. A method according to claim 1, wherein the step of processing the scattered radiation comprises using a random or quasi-random modulation continuous wave Lidar gas absorption detection technique.

8. A method according to claim 1, wherein the method comprises a step of performing multiple scans within the first wavelength spectrum, each scan including one or more "on" wavelengths associated with one or more spectral features of a first substance to be detected and one or more "off" wavelengths that are not associated with the one or more spectral features of the first substance, the optical device being operable to continuously tune the first emission wavelength during each scan.

9. A method according to claim 1, wherein the method comprises the step of continuously scanning a plurality of wavelength spectra and/or detecting a plurality of gases.

10. A method according to claim 1, wherein the method comprises the step of continuously tuning the first emission wavelength of the diode laser in a non-linear manner over time.

11. A gas detection device, comprising:
a diode laser operable to output first output radiation, wherein the first output radiation comprises a continuous wave output;
a control element operable to tune a first emission wavelength of the first output radiation from the diode laser continuously within a first wavelength spectrum at a rate of at least 1 µm per second by modulating a drive current of the diode laser with a first drive current modulation having a frequency of at least 100 kHz, the first wavelength spectrum comprising a first spectral feature associated with at least part of a gas absorption spectrum of at least one gas to be detected;
a modulator operable to apply a first output modulation to the first output radiation from the diode laser, the first output modulation comprising a first plurality of binary pulses;
an optical transceiver system operable to transmit the modulated first output radiation from the diode laser in a three-dimensional scan towards a first target location using optical guide elements, and to collect scattered diode laser radiation and direct it to a detector using at least one of said optical guide elements, the scattered diode laser radiation having been at least partially modified by the, or each, gas between the gas detection device and the first target location;
a detector operable to receive the scattered diode laser radiation collected by the optical transceiver system; and
a processing element operable to process the received scattered radiation by (i) correlating the received scattered diode laser radiation with the transmitted first output radiation to create one or more correlated data sets, and (ii) forming an area scan of target locations to determine concentration of the at least one gas between the gas detection device and each target location, wherein multiple correlated data sets corresponding to fixed spatial points are used for determining concentration of the gas for each target location.

12. A gas detection device according to claim 11, wherein the control element is operable to scan the first wavelength spectrum at a rate of between 1 µm per second and 10 m per second.

13. A gas detection device according to claim 11, wherein the first drive current modulation has a frequency of between 100 kHz and 100 MHz.

14. A gas detection device according to claim 11, wherein the first wavelength spectrum has a wavelength range of between 10 pm and 100 nm.

15. A gas detection device according to claim 14, wherein the first plurality of pulses comprises one of: a plurality of pulses in a random pulse sequence; a plurality of pulses in a pseudo-random sequence; or a plurality of pulses in a predefined sequence.

16. A gas detection device according to claim 11, wherein the first output modulation comprises a modulation frequency of at least 10 MHz.

17. A gas detection device according to claim 11, wherein the processing element is operable to use a random or quasi-random modulation continuous wave Lidar gas absorption detection technique.

18. A gas detection device according to claim 11, wherein the detector comprises one of: a single photon avalanche diode element; an avalanche photodiode; or a linear mode avalanche photodiode.

19. A gas detection device according to claim 11, wherein the gas detection device comprises a single optical transceiver system operable to transmit the output radiation and to receive the scattered radiation.

20. A gas detection device according to claim 11, wherein the gas detection device is operable to perform multiple scans within the first wavelength spectrum, each scan including one or more "on" wavelengths associated with one or more spectral features of the gas to be detected and one or more "off" wavelengths that are not associated with the one or more spectral features of the gas to be detected, the gas detection device being operable to continuously tune the first emission wavelength during each scan.

21. A gas detection device according to claim 11, wherein the gas detection device is operable to continuously scan a plurality of wavelength spectra and/or wherein the gas detection device is operable to detect a plurality of gases.

22. A gas detection device according to claim 11, wherein the control element is operable to continuously tune the first emission wavelength of the diode laser in a non-linear manner over time.

23. A gas detection device according to claim 11, wherein the modulator comprises a semiconductor optical amplifier configured to modulate the first output radiation and to output the modulated first output radiation.

24. An optical device,
wherein the optical device is operable to output first output radiation from a diode laser,
wherein the first output radiation comprises a continuous wave output;
wherein the optical device is operable to tune a first emission wavelength of the first output radiation continuously within a first wavelength spectrum at a rate of at least 1 µm per second by modulating a drive current of the diode laser with a first drive current modulation having a frequency of at least 100 kHz, the first wavelength spectrum comprising a first spectral feature associated with a first characteristic of a first substance;

wherein the optical device is operable to apply a first output modulation to the first output radiation;

wherein the optical device is operable to transmit the modulated first output radiation through optical guide elements in a three-dimensional scan towards a first target location, and to receive scattered radiation from the target location and direct it to a detector using at least one of said optical guide elements, the scattered radiation having been at least partially modified by the first substance in the first target location; and wherein the optical device is operable to process the received scattered radiation by (i) correlating the received scattered radiation with the transmitted first output radiation to create one or more correlated data sets; and (ii) forming an area scan of locations in a first target area to determine concentration of the first substance between the optical device and the locations, wherein multiple correlated data sets corresponding to fixed spatial points are used for determining the concentration of the first substance for each of the locations.

\* \* \* \* \*